US012683852B2

(12) United States Patent
Dukhovny et al.

(10) Patent No.: US 12,683,852 B2
(45) Date of Patent: Jul. 14, 2026

(54) ROOT CAUSE AND IMPACT DETERMINATION BASED ON AUTOMATED SERVICE IDENTIFICATION

(71) Applicant: ServiceNow, Inc., Santa Clara, CA (US)

(72) Inventors: Vadim Dukhovny, Petah Tikva (IL); Robert Bitterfeld, Petah Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/397,183

(22) Filed: Dec. 27, 2023

(65) Prior Publication Data

US 2025/0219893 A1     Jul. 3, 2025

(51) Int. Cl.
*H04L 41/0631*          (2022.01)
*H04L 41/0604*          (2022.01)
*H04L 41/16*            (2022.01)

(52) U.S. Cl.
CPC ...... *H04L 41/0631* (2013.01); *H04L 41/0604* (2013.01); *H04L 41/16* (2013.01)

(58) Field of Classification Search
CPC .. H04L 41/0631; H04L 41/0604; H04L 41/16
See application file for complete search history.

(56) References Cited

U.S. PATENT DOCUMENTS 4,941,084 A     7/1990   Terada
5,185,860 A     2/1993   Wu 5,237,518 A     8/1993   Sztipanovits
5,261,097 A     11/1993  Saxon
5,265,252 A     11/1993  Rawson, III
5,367,685 A     11/1994  Gosling
5,390,297 A     2/1995   Barber
5,442,791 A     8/1995   Wrabetz
5,452,415 A     9/1995   Hotka
(Continued)

FOREIGN PATENT DOCUMENTS

EP     0433979 A2     6/1991
EP     1607824 A2     12/2005
(Continued)

OTHER PUBLICATIONS

International Search Report and Written Opinion, PCT Application PCT/US2024/047410, mailed Dec. 24, 2024.

*Primary Examiner* — Abdelbasst Talioua
(74) *Attorney, Agent, or Firm* — McDonnell Boehnen Hulbert & Berghoff LLP

(57)          ABSTRACT

An implementation may involve: obtaining a representation of a network event relating to a network, wherein the network enables operation of a plurality of services each involving one or more computing devices or software applications; obtaining information associated with the network event, wherein the information identifies one of the computing devices or the software applications; based on the information, identifying a subset of services of the plurality of services based on determining that each of the subset of services satisfies an impact criterion with respect to the network event, wherein the subset of services are associated with candidate service maps that were generated by a machine learning process; and providing an indication that the subset of services are related to the network event.

19 Claims, 11 Drawing Sheets

(56) References Cited

U.S. PATENT DOCUMENTS

| | | | |
|---|---|---|---|
| 5,522,042 A | 5/1996 | Fee | |
| 5,533,116 A | 7/1996 | Vesterinen | |
| 5,655,081 A | 8/1997 | Bonnell | |
| 5,659,736 A | 8/1997 | Hasegawa | |
| 5,671,412 A | 9/1997 | Christiano | |
| 5,696,701 A | 12/1997 | Burgess | |
| 5,715,463 A | 2/1998 | Merkin | |
| 5,745,879 A | 4/1998 | Wyman | |
| 5,761,502 A | 6/1998 | Jacobs | |
| 5,764,913 A | 6/1998 | Jancke | |
| 5,887,139 A | 3/1999 | Madison, Jr. | |
| 5,909,217 A | 6/1999 | Bereiter | |
| 5,937,165 A | 8/1999 | Schwaller | |
| 5,949,976 A | 9/1999 | Chappelle | |
| 5,978,594 A | 11/1999 | Bonnell | |
| 6,021,437 A | 2/2000 | Chen | |
| 6,041,347 A | 3/2000 | Harsham | |
| 6,088,717 A | 7/2000 | Reed | |
| 6,101,500 A | 8/2000 | Lau | |
| 6,128,016 A | 10/2000 | Coelho | |
| 6,131,118 A | 10/2000 | Stupek, Jr. | |
| 6,134,581 A | 10/2000 | Ismael | |
| 6,138,122 A | 10/2000 | Smith | |
| 6,148,335 A | 11/2000 | Haggard | |
| 6,166,732 A | 12/2000 | Mitchell | |
| 6,167,448 A | 12/2000 | Hemphill | |
| 6,175,866 B1 | 1/2001 | Holloway | |
| 6,175,878 B1 | 1/2001 | Seaman | |
| 6,260,050 B1 | 7/2001 | Yost | |
| 6,263,457 B1 | 7/2001 | Anderson | |
| 6,272,150 B1 | 8/2001 | Hrastar | |
| 6,336,138 B1 | 1/2002 | Caswell | |
| 6,363,421 B2 | 3/2002 | Barker | |
| 6,393,386 B1 | 5/2002 | Zager | |
| 6,397,245 B1 | 5/2002 | Johnson, II | |
| 6,434,626 B1 | 8/2002 | Prakash | |
| 6,438,592 B1 | 8/2002 | Killian | |
| 6,456,306 B1 | 9/2002 | Chin | |
| 6,466,932 B1 | 10/2002 | Dennis | |
| 6,487,590 B1 | 11/2002 | Foley | |
| 6,505,248 B1 | 1/2003 | Casper | |
| 6,526,442 B1 | 2/2003 | Stupek, Jr. | |
| 6,621,823 B1 | 9/2003 | Mellquist | |
| 6,707,795 B1 | 3/2004 | Noorhosseini | |
| 6,742,015 B1 | 5/2004 | Bowman-Amuah | |
| 6,763,380 B1 | 7/2004 | Mayton | |
| 6,816,898 B1 | 11/2004 | Joe | |
| 6,895,586 B1 | 5/2005 | Brasher | |
| 6,948,175 B1 | 9/2005 | Fong | |
| 6,985,901 B1 | 1/2006 | Sachse | |
| 7,003,564 B2 | 2/2006 | Greuel | |
| 7,028,228 B1 | 4/2006 | Lovy | |
| 7,043,537 B1 | 5/2006 | Pratt | |
| 7,043,661 B2 | 5/2006 | Valadarsky | |
| 7,062,683 B2 | 6/2006 | Warpenburg | |
| 7,096,459 B2 * | 8/2006 | Keller | G06F 11/0709 |
| | | | 717/124 |
| 7,146,574 B2 | 12/2006 | Goldthwaite | |
| 7,197,466 B1 | 3/2007 | Peterson | |
| 7,215,360 B2 | 5/2007 | Gupta | |
| 7,216,304 B1 | 5/2007 | Gourdol | |
| 7,222,147 B1 | 5/2007 | Black | |
| 7,281,170 B2 | 10/2007 | Taylor | |
| 7,328,260 B1 | 2/2008 | Muthiyan | |
| 7,412,502 B2 | 8/2008 | Fearn | |
| 7,505,872 B2 | 3/2009 | Keller | |
| 7,593,013 B2 | 9/2009 | Agutter | |
| 7,596,716 B2 | 9/2009 | Frost | |
| 7,617,073 B2 | 11/2009 | Trinon | |
| 7,660,731 B2 | 2/2010 | Chaddha | |
| 7,676,294 B2 | 3/2010 | Baier | |
| 7,676,437 B2 | 3/2010 | Satkunanathan | |
| 7,840,490 B1 | 11/2010 | Sellers | |
| 7,877,783 B1 | 1/2011 | Cline | |
| 7,890,869 B1 | 2/2011 | Mayer | |

| | | | |
|---|---|---|---|
| 7,966,398 B2 | 6/2011 | Wiles, Jr. | |
| 8,060,396 B1 | 11/2011 | Bessler | |
| 8,196,210 B2 | 6/2012 | Sterin | |
| 8,321,948 B2 | 11/2012 | Robinson | |
| 8,407,669 B2 | 3/2013 | Yee | |
| 8,554,750 B2 | 10/2013 | Rangarajan | |
| 8,595,647 B2 | 11/2013 | Sabin | |
| 8,620,818 B2 | 12/2013 | Hughes | |
| 8,646,093 B2 | 2/2014 | Myers | |
| 8,674,992 B2 | 3/2014 | Poston | |
| 8,725,647 B2 | 5/2014 | Disciascio | |
| 9,053,460 B2 | 6/2015 | Gilbert | |
| 9,069,737 B1 | 6/2015 | Kimotho | |
| 9,971,826 B1 | 5/2018 | Belmar | |
| 10,257,289 B2 * | 4/2019 | Africa | H04L 41/0856 |
| 10,425,292 B1 * | 9/2019 | Biran | H04L 63/062 |
| 10,437,695 B2 * | 10/2019 | Sobue | G06F 11/0751 |
| 10,491,692 B1 * | 11/2019 | Feiguine | G06F 9/5072 |
| 10,547,633 B1 * | 1/2020 | Dell'Amico | H04L 41/024 |
| 10,673,963 B1 | 6/2020 | Feiguine | |
| 10,708,139 B2 | 7/2020 | Rosh | |
| 10,749,943 B1 | 8/2020 | Feiguine | |
| 10,764,124 B1 * | 9/2020 | Ben Ari | H04L 67/133 |
| 10,771,344 B2 | 9/2020 | Bitterfeld | |
| 10,824,650 B2 | 11/2020 | Bar Oz | |
| 10,931,630 B2 * | 2/2021 | Dias | H04L 67/141 |
| 10,944,654 B2 | 3/2021 | Rimar | |
| 10,970,107 B2 * | 4/2021 | Aron | G06F 8/65 |
| 10,999,152 B1 | 5/2021 | Bar Oz | |
| 11,025,481 B1 | 6/2021 | Louca | |
| 11,044,143 B2 * | 6/2021 | Makovsky | H04L 41/22 |
| 11,089,115 B2 | 8/2021 | Garty | |
| 11,095,506 B1 | 8/2021 | Erblat | |
| 11,100,199 B2 * | 8/2021 | Subramaniam | H04L 63/102 |
| 11,140,042 B2 | 10/2021 | Bitterfeld | |
| 11,176,464 B1 | 11/2021 | Sagi | |
| 11,275,580 B2 | 3/2022 | Tamir | |
| 11,277,475 B1 | 3/2022 | Tal | |
| 11,281,442 B1 | 3/2022 | Tal | |
| 11,294,666 B1 | 4/2022 | Look | |
| 11,296,922 B2 | 4/2022 | Leibkowiz | |
| 11,301,503 B2 | 4/2022 | Burli | |
| 11,316,746 B1 * | 4/2022 | Bitterfeld | H04L 41/5009 |
| 11,379,089 B2 | 7/2022 | Goswami | |
| 11,388,040 B2 | 7/2022 | Mdini | |
| 11,451,573 B2 | 9/2022 | Waplington | |
| 11,470,107 B2 | 10/2022 | Waplington | |
| 11,582,106 B2 | 2/2023 | Hameiri | |
| 11,616,690 B2 | 3/2023 | Feiguine | |
| 11,630,717 B2 | 4/2023 | Vutukuru | |
| 11,632,303 B2 | 4/2023 | Bitterfeld | |
| 11,640,369 B2 | 5/2023 | Bhogle | |
| 11,671,444 B2 | 6/2023 | Waplington | |
| 11,695,641 B2 | 7/2023 | Bar Oz | |
| 11,706,243 B2 | 7/2023 | Singh | |
| 11,729,082 B2 * | 8/2023 | Turi | H04L 41/22 |
| | | | 709/224 |
| 11,748,184 B2 * | 9/2023 | Thakkar | G06F 11/079 |
| | | | 714/37 |
| 11,775,375 B2 | 10/2023 | Chesneau | |
| 11,902,111 B1 * | 2/2024 | McKim | H04L 41/5032 |
| 11,954,568 B2 * | 4/2024 | Doddala | G06N 20/00 |
| 12,015,527 B1 * | 6/2024 | Liu | G06Q 10/0631 |
| 2002/0116340 A1 | 8/2002 | Hellberg | |
| 2002/0133584 A1 | 9/2002 | Greuel | |
| 2002/0158969 A1 | 10/2002 | Gupta | |
| 2003/0118087 A1 | 6/2003 | Goldthwaite | |
| 2003/0200293 A1 | 10/2003 | Fearn | |
| 2005/0015217 A1 | 1/2005 | Weidl | |
| 2005/0091356 A1 * | 4/2005 | Izzo | H04L 41/0631 |
| | | | 709/223 |
| 2005/0144188 A1 * | 6/2005 | Bailey | G06Q 10/0639 |
| 2005/0278646 A1 * | 12/2005 | Liscano | H04L 67/303 |
| | | | 717/100 |
| 2006/0026453 A1 | 2/2006 | Frost | |
| 2006/0072707 A1 * | 4/2006 | Araujo | H04L 41/06 |
| | | | 379/1.01 |
| 2006/0095461 A1 | 5/2006 | Raymond | |
| 2006/0179058 A1 | 8/2006 | Bram | |

(56) References Cited

U.S. PATENT DOCUMENTS

| | | | |
|---|---|---|---|
| 2006/0288053 A1 | 12/2006 | Holt | |
| 2006/0293942 A1 | 12/2006 | Chaddha | |
| 2007/0033279 A1 | 2/2007 | Battat | |
| 2007/0165818 A1* | 7/2007 | Savoor | H04M 3/08 |
| | | | 379/201.12 |
| 2007/0188494 A1 | 8/2007 | Agutter | |
| 2007/0288389 A1 | 12/2007 | Vaughan | |
| 2008/0133289 A1 | 6/2008 | Armour | |
| 2008/0148253 A1 | 6/2008 | Badwe | |
| 2008/0319779 A1 | 12/2008 | Hughes | |
| 2009/0088875 A1 | 4/2009 | Baier | |
| 2009/0228984 A1 | 9/2009 | Sterin | |
| 2010/0110932 A1 | 5/2010 | Doran | |
| 2011/0044177 A1* | 2/2011 | Nair | H04W 36/26 |
| | | | 370/241 |
| 2011/0119530 A1* | 5/2011 | Lazzaro | G06F 11/008 |
| | | | 714/39 |
| 2013/0283273 A1 | 10/2013 | Miyazaki | |
| 2013/0290500 A1* | 10/2013 | Narendra | H04L 67/51 |
| | | | 709/223 |
| 2014/0122427 A1 | 5/2014 | Dary | |
| 2014/0344129 A1* | 11/2014 | Campbell | G06Q 40/02 |
| | | | 705/35 |
| 2014/0379895 A1* | 12/2014 | Jain | H04L 41/0654 |
| | | | 709/224 |
| 2015/0161189 A1* | 6/2015 | Trinon | G06F 9/542 |
| | | | 707/609 |
| 2016/0226789 A1* | 8/2016 | Sundararajan | G06F 9/5088 |
| 2018/0123940 A1 | 5/2018 | Rimar | |
| 2018/0167275 A1* | 6/2018 | Kovacheva | H04L 41/40 |
| 2018/0300041 A1* | 10/2018 | Tilikin | H04L 41/0853 |
| 2019/0044815 A1* | 2/2019 | Rosh | H04L 41/22 |
| 2019/0050745 A1* | 2/2019 | Rimar | H04W 8/005 |
| 2019/0052531 A1* | 2/2019 | Sividia | H04L 41/0895 |
| 2019/0073257 A1 | 3/2019 | Dasgupta | |
| 2019/0102469 A1* | 4/2019 | Makovsky | G06F 11/0781 |
| 2019/0104019 A1* | 4/2019 | Makovsky | G06F 8/34 |
| 2019/0104023 A1* | 4/2019 | Rimar | H04L 43/045 |
| 2019/0104024 A1* | 4/2019 | Biran | H04L 41/065 |
| 2019/0104398 A1 | 4/2019 | Owen | |
| 2019/0129739 A1 | 5/2019 | Al Reza | |
| 2019/0149515 A1 | 5/2019 | Sharma | |
| 2019/0165957 A1 | 5/2019 | Abbott | |
| 2019/0235742 A1* | 8/2019 | Tilikin | G06F 3/04847 |
| 2019/0306009 A1* | 10/2019 | Makovsky | G06Q 10/10 |
| 2019/0306691 A1* | 10/2019 | Garty | H04W 48/16 |
| 2019/0306692 A1* | 10/2019 | Garty | H04L 67/51 |
| 2019/0311253 A1* | 10/2019 | Chung | G06N 3/063 |
| 2019/0342162 A1 | 11/2019 | Bendre | |
| 2019/0379590 A1* | 12/2019 | Rimar | G06F 16/9024 |
| 2020/0034462 A1 | 1/2020 | Narayanasamy | |
| 2020/0050689 A1* | 2/2020 | Tal | G06F 16/23 |
| 2020/0074048 A1* | 3/2020 | Subramaniam | H04L 63/1425 |
| 2020/0204443 A1 | 6/2020 | Bar Oz | |
| 2020/0228396 A1* | 7/2020 | Margalit | G06F 11/3006 |
| 2020/0228408 A1* | 7/2020 | Ben Ari | G06F 16/245 |
| 2020/0236129 A1* | 7/2020 | Barkovic | H04L 43/045 |
| 2020/0236187 A1* | 7/2020 | Tal | H04L 63/0281 |
| 2020/0293184 A1* | 9/2020 | Makovsky | G06F 9/451 |
| 2020/0301678 A1 | 9/2020 | Burman | |
| 2020/0314180 A1* | 10/2020 | Sant | G06F 16/2282 |
| 2020/0349238 A1* | 11/2020 | Tyagi | G06F 21/105 |
| 2020/0351151 A1* | 11/2020 | Dang | H04L 41/22 |
| 2020/0351178 A1* | 11/2020 | Guha | H04L 41/12 |
| 2020/0374179 A1 | 11/2020 | Arrabolu | |
| 2020/0382361 A1 | 12/2020 | Chandrasekhar | |
| 2020/0403852 A1* | 12/2020 | Ben Ari | H04L 67/133 |
| 2020/0409780 A1* | 12/2020 | Balasubramanian | |
| | | | G06F 9/3838 |
| 2021/0089370 A1* | 3/2021 | Dukhovny | G06F 11/301 |
| 2021/0097168 A1 | 4/2021 | Patel | |
| 2021/0194764 A1 | 6/2021 | Badyan | |
| 2021/0200814 A1* | 7/2021 | Tal | G06F 16/90335 |
| 2021/0211294 A1* | 7/2021 | Ferrington | H04L 9/3236 |
| 2021/0226847 A1* | 7/2021 | Jindal | H04L 41/5054 |
| 2021/0248105 A1* | 8/2021 | Gentile | G06N 3/045 |
| 2021/0320836 A1* | 10/2021 | Leibkowiz | H04L 41/0816 |
| 2021/0392155 A1* | 12/2021 | Waplington | H04L 63/1433 |
| 2021/0406041 A1* | 12/2021 | Saraiya | G06F 16/287 |
| 2022/0050675 A1* | 2/2022 | Tamir | G06F 21/577 |
| 2022/0078224 A1* | 3/2022 | Saxena | H04L 41/0293 |
| 2022/0083883 A1* | 3/2022 | Devanathan | G06F 3/0482 |
| 2022/0109611 A1* | 4/2022 | Bitterfeld | H04L 43/08 |
| 2022/0239564 A1* | 7/2022 | Jiang | G06N 5/01 |
| 2022/0333477 A1* | 10/2022 | Kalyanraman | E21B 44/00 |
| 2022/0357733 A1* | 11/2022 | Crane | G05B 23/0281 |
| 2022/0357940 A1* | 11/2022 | Crane | G06F 11/3089 |
| 2022/0393934 A1 | 12/2022 | Hsu | |
| 2022/0407779 A1 | 12/2022 | Arrabolu | |
| 2023/0011452 A1* | 1/2023 | Barber | G06F 16/24558 |
| 2023/0048513 A1* | 2/2023 | Gao | G06F 11/0793 |
| 2023/0071119 A1* | 3/2023 | Wolf | G06F 21/554 |
| 2023/0118856 A1* | 4/2023 | Sasikumar | H04L 41/0686 |
| | | | 709/224 |
| 2023/0139243 A1* | 5/2023 | Zhao | G01C 21/3623 |
| | | | 707/722 |
| 2023/0195557 A1* | 6/2023 | Gupta | G06F 11/0772 |
| | | | 714/37 |
| 2023/0305944 A1* | 9/2023 | Biswas | G06F 11/3006 |
| 2023/0396515 A1* | 12/2023 | Hashemi | H04L 41/22 |
| 2024/0086771 A1* | 3/2024 | Kumar | G16H 40/20 |
| 2024/0427658 A1* | 12/2024 | Pinahs | G06F 11/079 |
| 2025/0029711 A1* | 1/2025 | Anderson | G16H 40/20 |

FOREIGN PATENT DOCUMENTS

| | | | |
|---|---|---|---|
| WO | 9934285 W | 7/1999 | |
| WO | 0052559 W | 9/2000 | |
| WO | 0179970 W | 10/2001 | |

* cited by examiner

700

| NAME | FIELD NAME | DESCRIPTION |
|---|---|---|
| SOURCE | EM_EVENT.SOURCE | EVENT MONITORING SOFTWARE THAT GENERATED THE EVENT |
| NODE | EM_EVENT.NODE | NODE NAME, FULLY QUALIFIED DOMAIN NAME (FQDN), IP ADDRESS, OR MAC ADDRESS THAT IS ASSOCIATED WITH THE EVENT |
| TYPE | EM_EVENT.TYPE | METRIC TYPE TO WHICH THE EVENT IS RELATED (E.G., DISK OR CPU) |
| RESOURCE | EM_EVENT.RESOURCE | NODE RESOURCE THAT IS RELEVANT TO THE EVENT (DISK C, CPU-1, THE NAME OF A PROCESS, OR SERVICE) |
| METRIC NAME | METRIC_NAME | NAME OF THE METRIC THAT HAS BEEN MEASURED (E.G., DISK FREE SPACE, DISK WRITE / SEC) |
| SOURCE INSTANCE | EM_EVENT.EVENT_CLASS | NAME OF THE MACHINE OR SOFTWARE THAT GENERATED THE EVENT |
| MESSAGE KEY | EM_EVENT.MESSAGE_KEY | UNIQUE EVENT IDENTIFIER FOR MULTIPLE EVENTS RELATED TO THE SAME ALERT |
| CONFIGURATION ITEM | EM_EVENT.CI_TYPE | STRING THAT REPRESENTS A CONFIGURATION ITEM |
| SEVERITY | EM_EVENT.SEVERITY | SEVERITY OF EVENT (E.G., CRITICAL, MAJOR, MINOR, WARNING, OK, CLEAR) |
| TIME OF EVENT | EM_EVENT.TIME_OF_EVENT | TIME THAT THE EVENT OCCURRED IN THE SOURCE SYSTEM |
| STATE | EM_EVENT.STATE | CURRENT PROCESSING STATE OF EVENT (E.G., READY, PROCESSED, ERROR) |
| ALERT | EM_EVENT.ALERT | UNIQUE ID USED TO IDENTIFY ALERT, IF ALERT IS CREATED FOR THE EVENT |
| DESCRIPTION | EM_EVENT.DESCRIPTION | REASON FOR EVENT GENERATION |
| PROCESSING NOTES | PROCESSING_NOTES | DISPLAY OF THE EVENTS PROCESSING LOG |

| NAME | FIELD NAME | VALUE |
|---|---|---|
| SOURCE | EM_EVENT.SOURCE | NETWORK PERFORMANCE MONITOR |
| NODE | EM_EVENT.NODE | SERVER123.COMPANY.COM |
| TYPE | EM_EVENT.TYPE | CPU |
| RESOURCE | EM_EVENT.RESOURCE | CPU-2 |
| METRIC NAME | METRIC_NAME | CPU USAGE (%) |
| SOURCE INSTANCE | EM_EVENT.EVENT_CLASS | PERFMON ON 192.168.1.10 |
| MESSAGE KEY | EM_EVENT.MESSAGE_KEY | EVENT_12345 |
| CONFIGURATION ITEM | EM_EVENT.CI_TYPE | {"NAME":"SERVER123","TYPE":"WINDOWS SERVER"} |
| SEVERITY | EM_EVENT.SEVERITY | MAJOR |
| TIME OF EVENT | EM_EVENT.TIME_OF_EVENT | 2023-12-01 14:30:00 |
| STATE | EM_EVENT.STATE | READY |
| ALERT | EM_EVENT.ALERT | ALERT_54321 |
| DESCRIPTION | EM_EVENT.DESCRIPTION | CPU USAGE EXCEEDED 90% THRESHOLD |
| PROCESSING NOTES | PROCESSING_NOTES | EVENT LOGGED AND ALERT CREATED, AWAITING INITIAL ASSESSMENT |

FIG. 7B

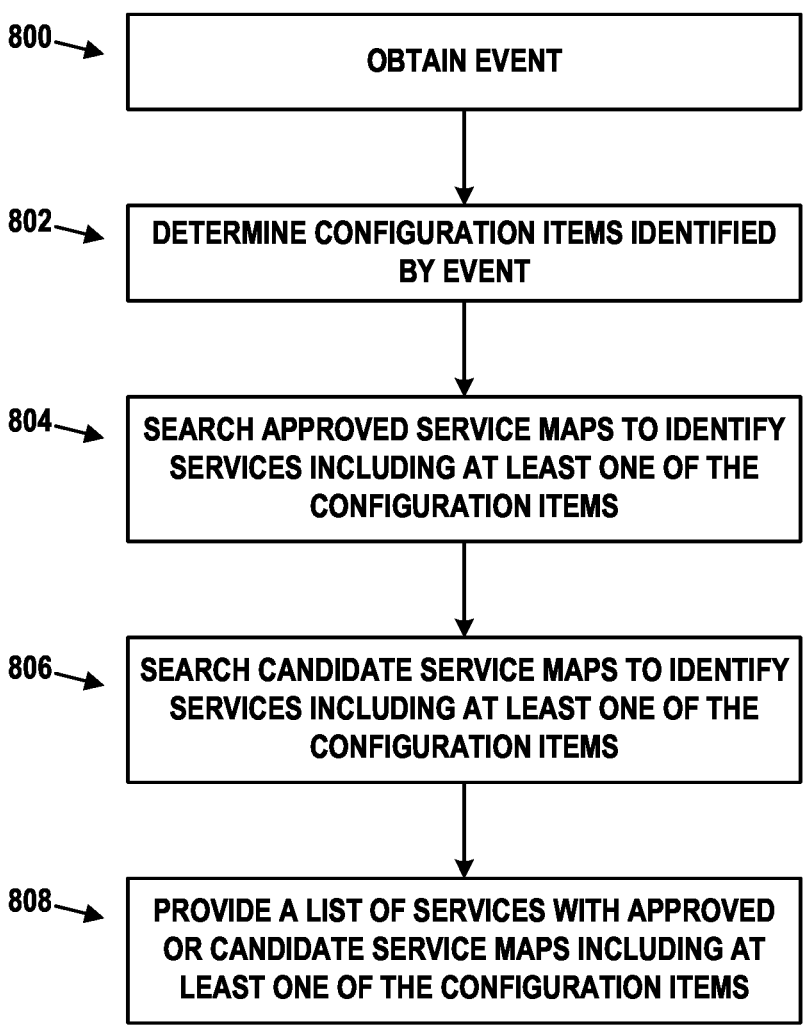

800 → OBTAIN EVENT

802 → DETERMINE CONFIGURATION ITEMS IDENTIFIED BY EVENT

804 → SEARCH APPROVED SERVICE MAPS TO IDENTIFY SERVICES INCLUDING AT LEAST ONE OF THE CONFIGURATION ITEMS

806 → SEARCH CANDIDATE SERVICE MAPS TO IDENTIFY SERVICES INCLUDING AT LEAST ONE OF THE CONFIGURATION ITEMS

808 → PROVIDE A LIST OF SERVICES WITH APPROVED OR CANDIDATE SERVICE MAPS INCLUDING AT LEAST ONE OF THE CONFIGURATION ITEMS

FIG. 8A

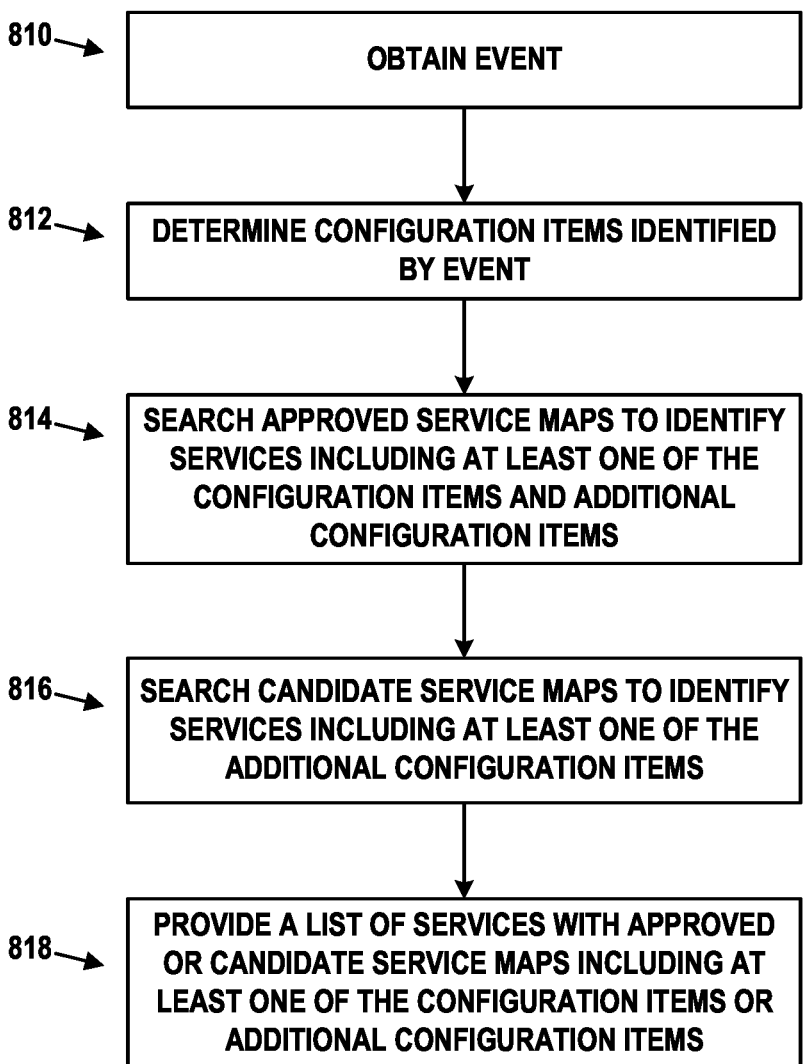

810 → OBTAIN EVENT

812 → DETERMINE CONFIGURATION ITEMS IDENTIFIED BY EVENT

814 → SEARCH APPROVED SERVICE MAPS TO IDENTIFY SERVICES INCLUDING AT LEAST ONE OF THE CONFIGURATION ITEMS AND ADDITIONAL CONFIGURATION ITEMS

816 → SEARCH CANDIDATE SERVICE MAPS TO IDENTIFY SERVICES INCLUDING AT LEAST ONE OF THE ADDITIONAL CONFIGURATION ITEMS

818 → PROVIDE A LIST OF SERVICES WITH APPROVED OR CANDIDATE SERVICE MAPS INCLUDING AT LEAST ONE OF THE CONFIGURATION ITEMS OR ADDITIONAL CONFIGURATION ITEMS

FIG. 8B

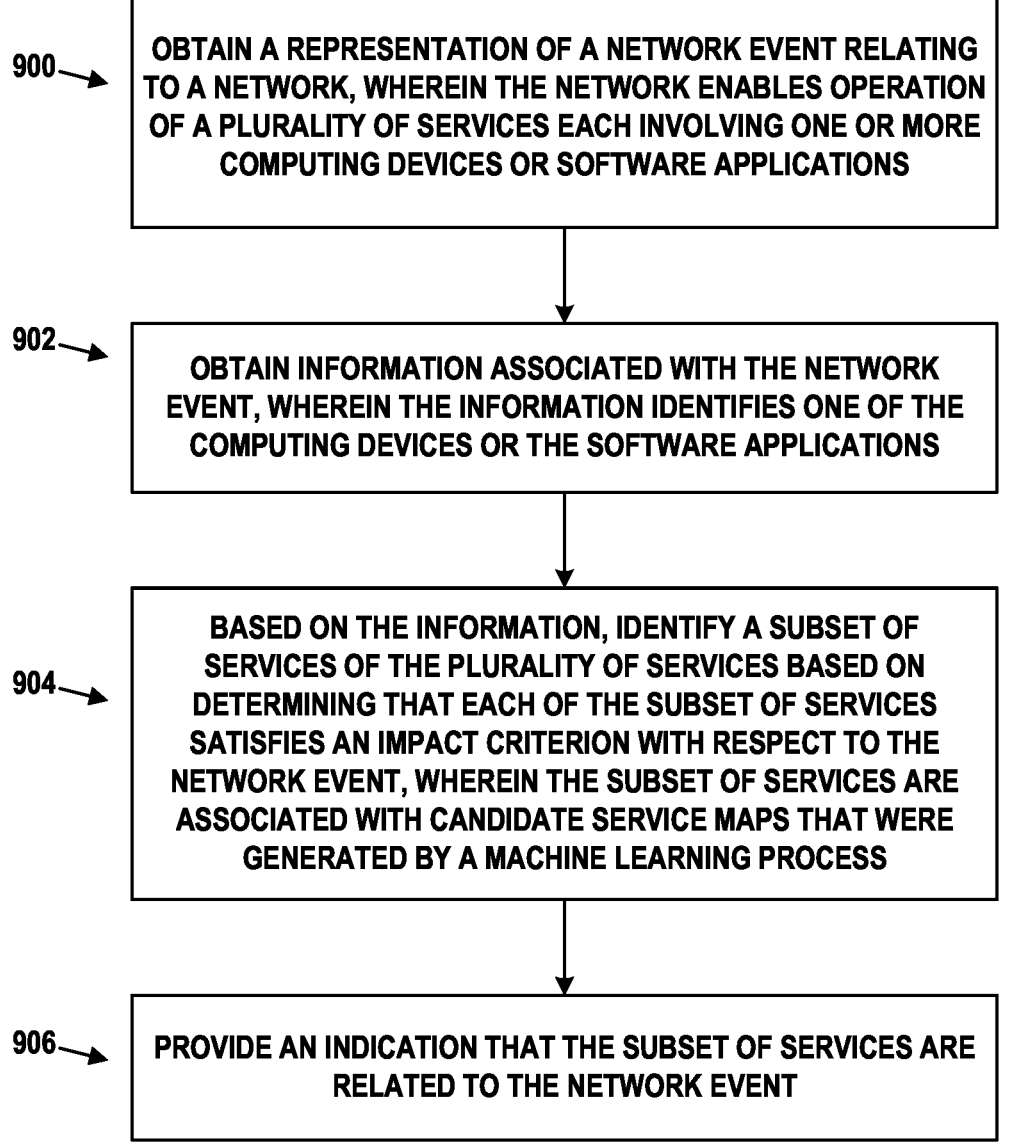

900 → OBTAIN A REPRESENTATION OF A NETWORK EVENT RELATING TO A NETWORK, WHEREIN THE NETWORK ENABLES OPERATION OF A PLURALITY OF SERVICES EACH INVOLVING ONE OR MORE COMPUTING DEVICES OR SOFTWARE APPLICATIONS

902 → OBTAIN INFORMATION ASSOCIATED WITH THE NETWORK EVENT, WHEREIN THE INFORMATION IDENTIFIES ONE OF THE COMPUTING DEVICES OR THE SOFTWARE APPLICATIONS

904 → BASED ON THE INFORMATION, IDENTIFY A SUBSET OF SERVICES OF THE PLURALITY OF SERVICES BASED ON DETERMINING THAT EACH OF THE SUBSET OF SERVICES SATISFIES AN IMPACT CRITERION WITH RESPECT TO THE NETWORK EVENT, WHEREIN THE SUBSET OF SERVICES ARE ASSOCIATED WITH CANDIDATE SERVICE MAPS THAT WERE GENERATED BY A MACHINE LEARNING PROCESS

906 → PROVIDE AN INDICATION THAT THE SUBSET OF SERVICES ARE RELATED TO THE NETWORK EVENT

FIG. 9

ROOT CAUSE AND IMPACT DETERMINATION BASED ON AUTOMATED SERVICE IDENTIFICATION

BACKGROUND

Root cause analysis of technical problems on networks allows identification of the sources of these problems, thereby enabling remediation or mitigation of thereof. However, current root cause analysis techniques and tools cannot identify the true extent of some problems (e.g., the number or type of systems, devices, applications, and/or services impacted). As a consequence, root cause determination lacks accuracy and takes longer than necessary, leaving devices and services in an unusable or compromised state for a long time.

SUMMARY

Various implementations disclosed herein include overcome these and potentially other technical problems by enhancing event management techniques with machine-learning based service mapping. This automated form of service mapping can rapidly identify candidate service maps for services deployed in a network. It can do so by determining relationships between configuration items (e.g., computing devices, the application software that executes thereon, and/or other components) based on various databases, log data, reported incidents, and/or observed network traffic. An event management application can search these candidate service maps to determine whether configuration items impacted by events are part of a service represented therein. Such services can be identified as potentially relevant to the root cause analysis. In this manner, root causes of issues reported by events can be determined faster and more accurately.

Accordingly, a first example embodiment may involve obtaining a representation of a network event relating to a network, wherein the network enables operation of a plurality of services each involving one or more computing devices or software applications; obtaining information associated with the network event, wherein the information identifies one of the computing devices or the software applications; based on the information, identifying a subset of services of the plurality of services based on determining that each of the subset of services satisfies an impact criterion with respect to the network event, wherein the subset of services are associated with candidate service maps that were generated by a machine learning process; and providing an indication that the subset of services are related to the network event.

A second example embodiment may involve a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7A depicts an event schema, in accordance with example embodiments.

FIG. 7B depicts an event, in accordance with example embodiments.

FIG. 8A is a flow chart of an event management process, in accordance with example embodiments.

FIG. 8B is a flow chart of an event management process, in accordance with example embodiments.

FIG. 9 is a flow chart, in accordance with example embodiments.

DETAILED DESCRIPTION

Figure 1:
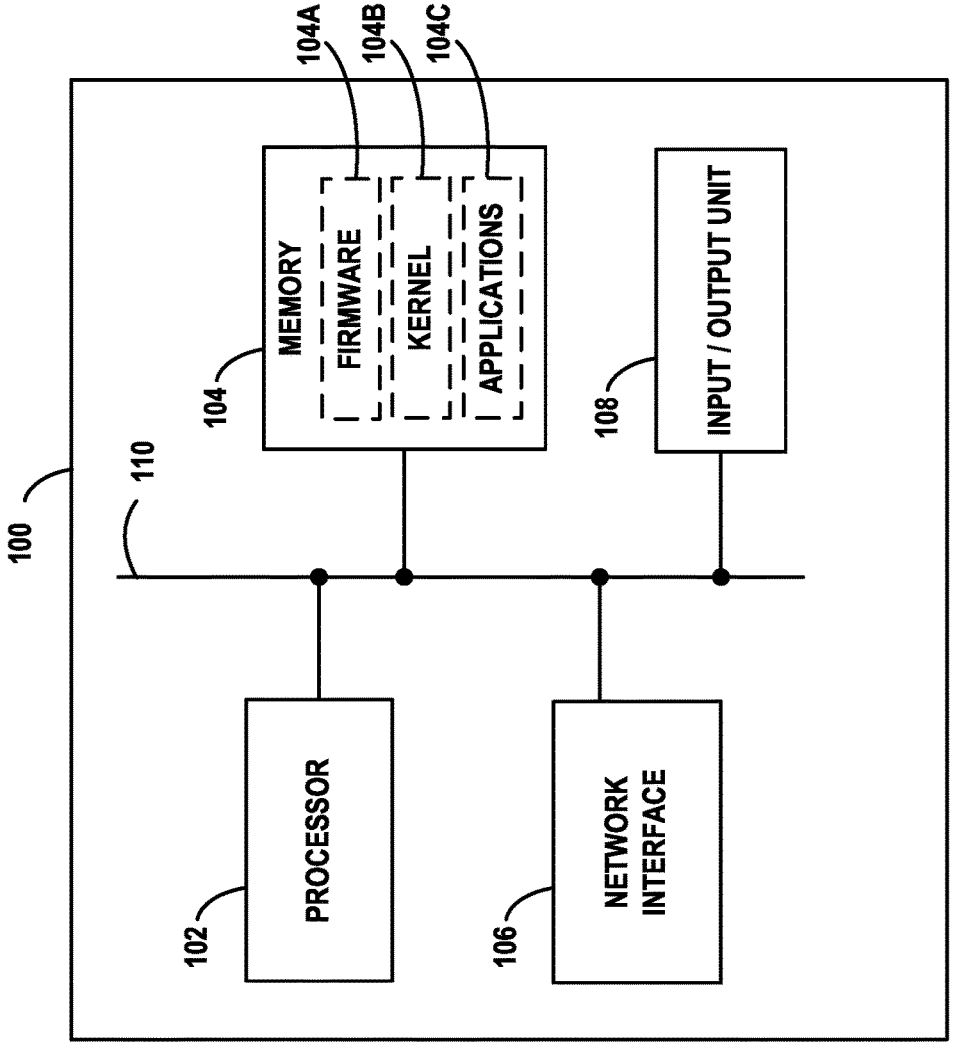
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
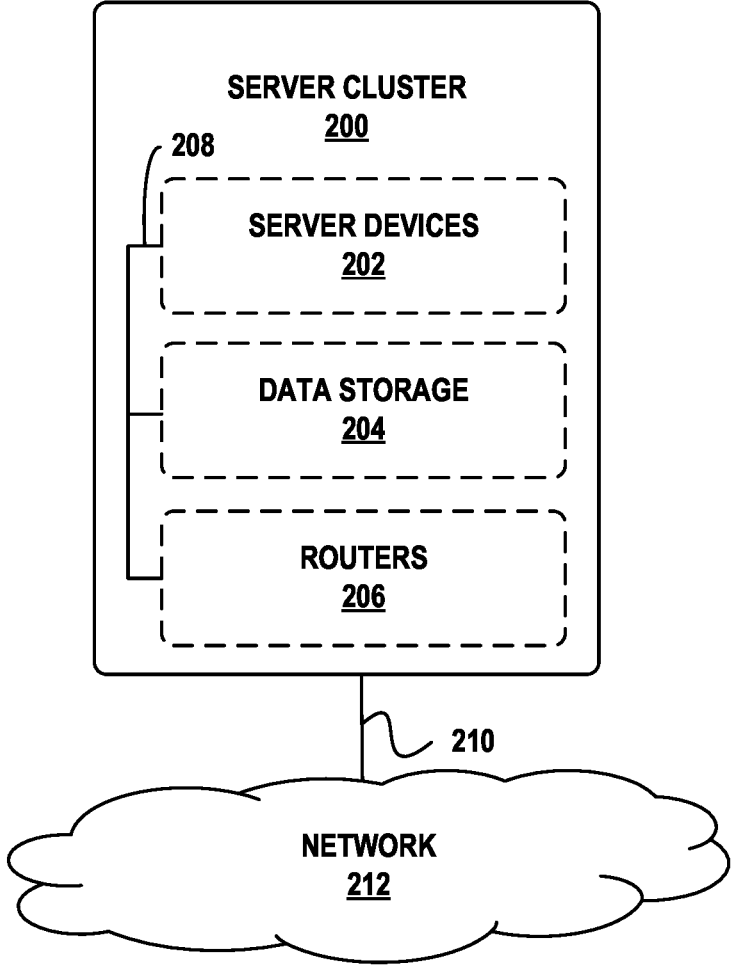
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the eXtensible Markup Language (XML), or some other standardized or proprietary format. Moreover, server devices 202 may have the capability of executing various types of computerized scripting languages, such as but not limited to Perl, Python, PUP Hypertext Preprocessor (PUP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
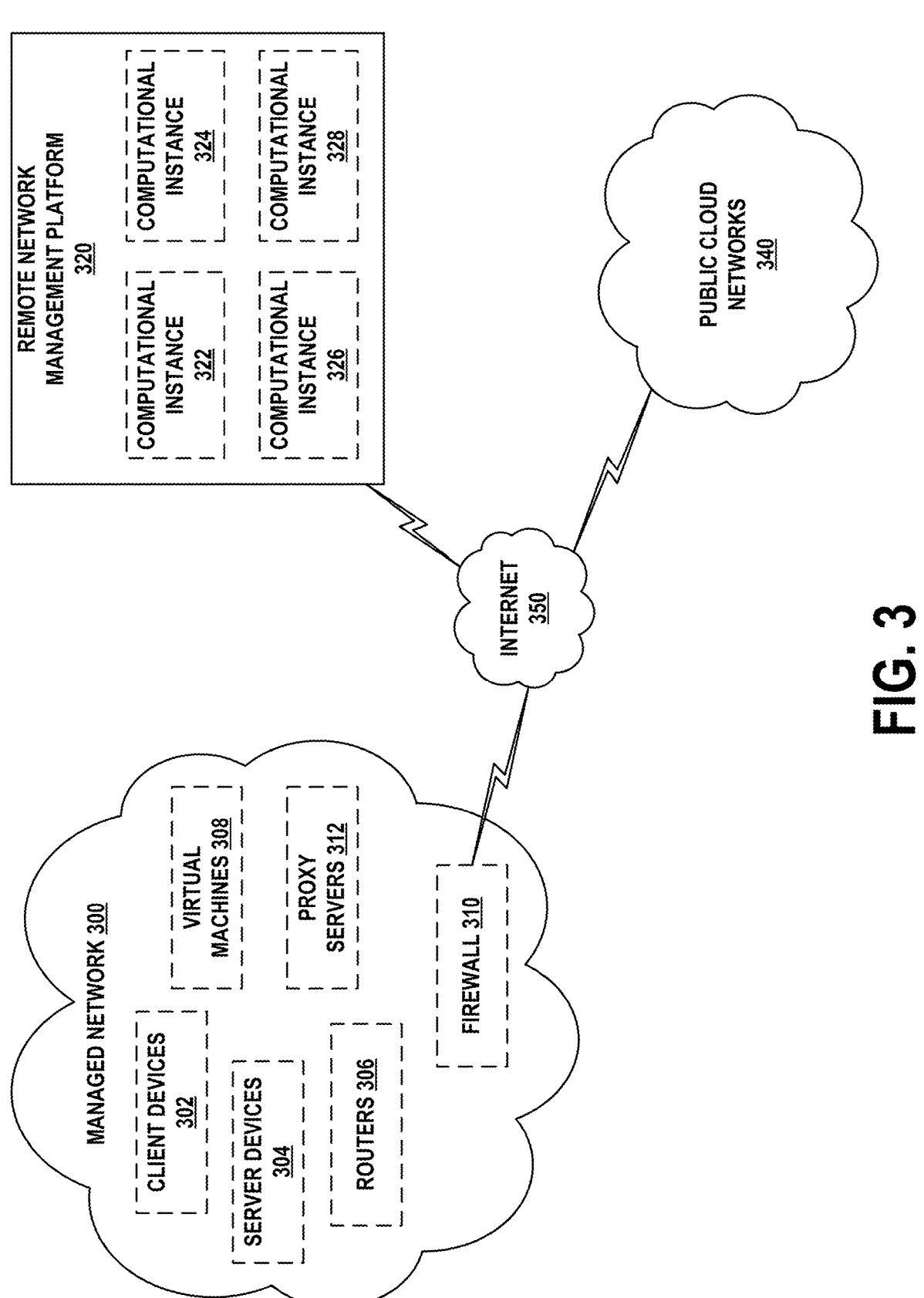
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall

310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
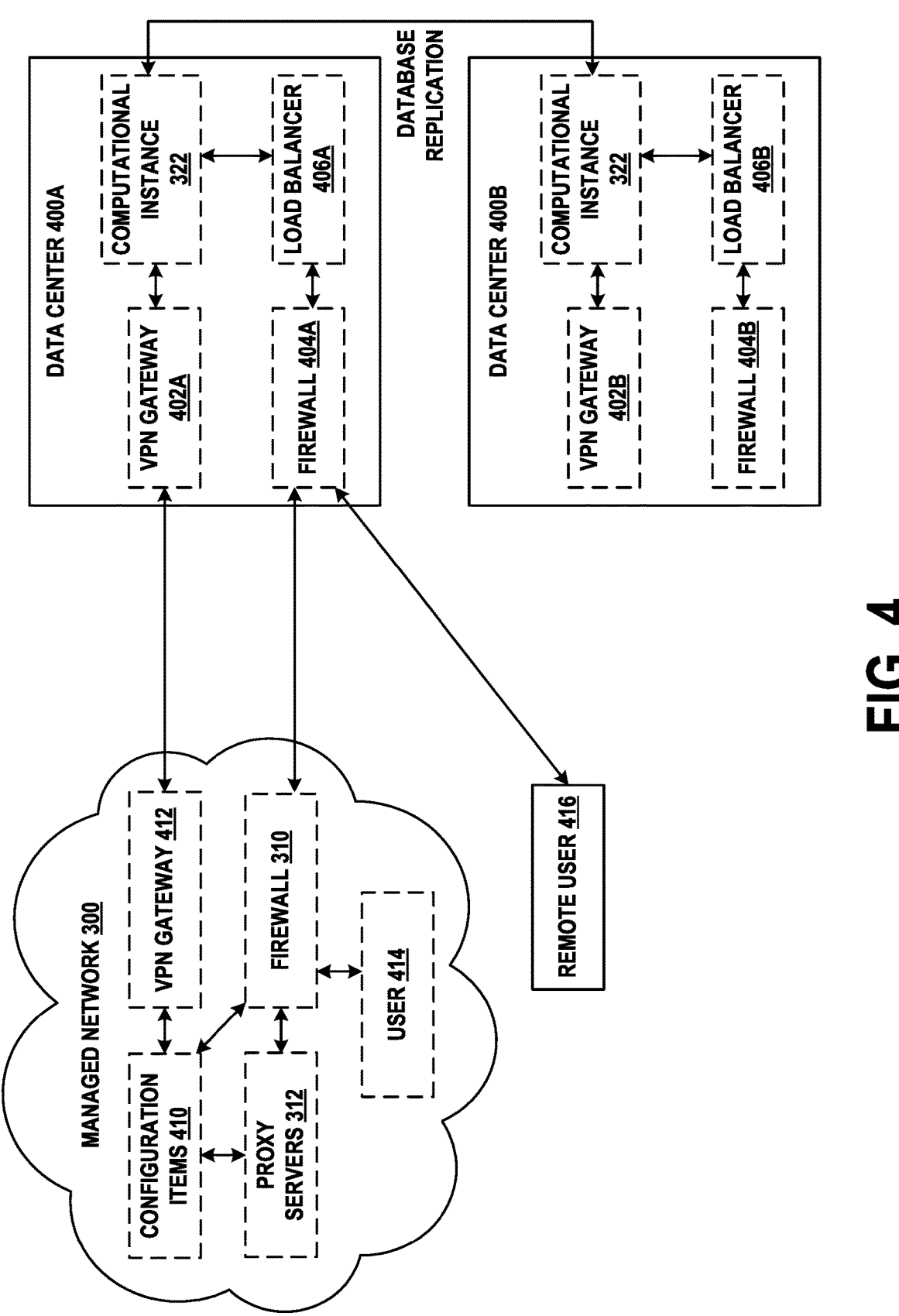
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. EXAMPLE DISCOVERY

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
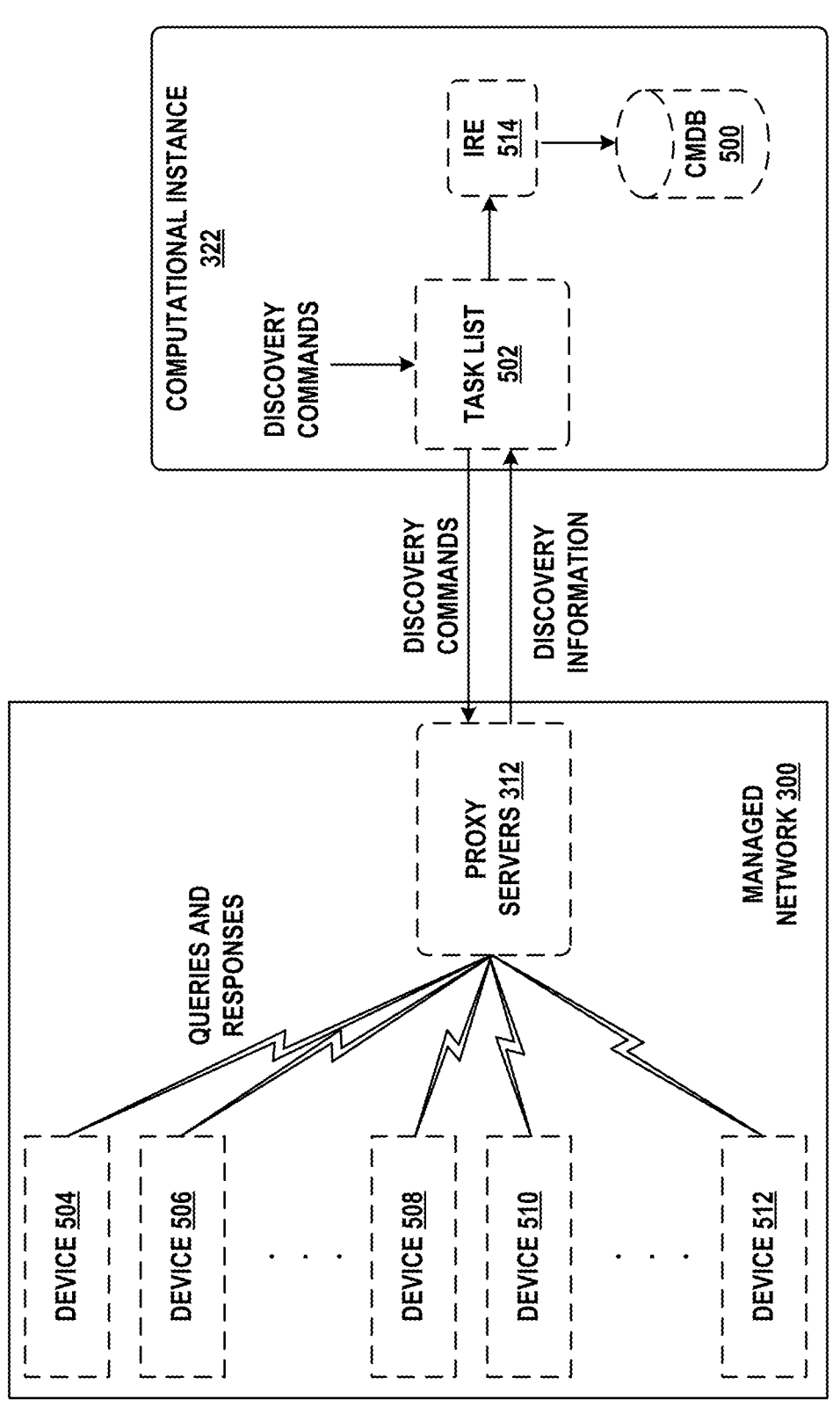
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB IDENTIFICATION RULES AND RECONCILIATION

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of RE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. EXAMPLE SERVICE MAPPING AND SERVICE MAPS

Service mapping refers to software executing on remote network management platform 320 or another platform that can identify interdependencies between computing devices, software applications, and/or other components deployed within a managed network or accessible to the managed network (e.g., disposed within a public cloud network used by the managed network). In doing so, a service mapping application may rely on horizontal, vertical, or top-down discovery to identify the computing devices, software applications, and/or other components, and record them as configuration items. Then, the service mapping application may employ a pattern-based approach, where it uses predefined discovery patterns to determine how services involving various configuration items are arranged and operate. For a given service, this may involve identifying one or more entry points through which client devices access the service. As noted above, these patterns can be extensive and cover a wide range of technologies, including servers, databases, middleware, and remote cloud-based infrastructure.

The service mapping application can generate a representation of the operational relationships between configuration items as a service map. Such a service map can be used to visualize the flow of data and interactions involving these configuration items, and may provide graphical representations of their service architecture. This visualization can be dynamic and thus be updated in real-time as changes occur in the managed network and elsewhere. In this fashion, the service map typically reflects the current state of the service architecture.

The service mapping application can be integrated with other modules of remote network management platform

320. For example, the data collected and produced by the service mapping application, including any service maps, can be stored in CMDB 500. This provides a single source of truth for service maps that can be used by other applications such as incident management, change management, event management, and root cause analysis, just to name a few.

Moreover, the service mapping application can play a role in enhancing the effectiveness of IT operations. By having a detailed understanding of service architectures, IT administrators (as well as automated procedures) can quickly identify and resolve issues, plan changes more effectively (by understanding which configuration items might be impacted by a change), and minimize the risk of unintended consequences. This leads to improved service availability and performance throughout remote network management platform 320.

Nonetheless, the evaluation and approval of service maps can be a lengthy process involving a number of manual steps. While an initial draft service map may be created by the service mapping software, this service map may remain in a partial and unapproved state until it is completed, tested and validated. Thus, once the initial service map is created, a subject matter expert who has in-depth knowledge of specific areas relating to the service map's content (e.g., the attributes, arrangement, and operation of its configuration items) may review the service map. This review can include adding and/or removing configuration items and relationships therebetween, as well as checks for accuracy regarding these configuration items and relationships. Functional testing may also be carried out to validate the service map. This can involve simulating various scenarios (like service outages, changes, etc.) to ensure that the service map accurately reflects the impacts and dependencies involved in these scenarios.

Once the testing process is complete and the service map is deemed accurate and ready for operational use, it is approved. Approved service maps may be stored in a table of CMDB 500 (or elsewhere) and used in production environments. These service maps may also be documented and integrated into various IT service management (ITSM) processes. Unapproved service maps may be stored in a different table, or stored in the same table but with indications that they are unapproved.

This entire approval process can take anywhere from a few weeks to several months or more depending the complexity of the service map. As a consequence, most managed networks have relatively few of their services represented by approved service maps.

In order to overcome these drawbacks and to facilitate the efficient production of service maps, automated service suggestion and/or predictive intelligence (both potentially based on machine learning and/or related techniques) can also be used to identify candidate service maps. Collectively, automated service suggestion, predictive intelligence, and other forms of machine-learning-based service mapping may be referred to as automated service identification.

Particularly, automated service suggestion identifies potential application fingerprints (identifiers) based on discovered processes (e.g., executing programs) within a managed network or cloud network. These may also be referred to as "application fingerprints" and may be respectively based on process attributes of the discovered processes. The process attributes may include a process name, an executable file name, a file system path, an execution command, and/or input arguments, among other information contained in the software process data.

A given application fingerprint may be represented as a vector that includes a plurality of values that represent the corresponding process attributes. Thus, the vector may be viewed as an embedding of the corresponding process attributes in a multi-dimensional vector space. In other implementations, the given application fingerprint may be represented as a character string that represents the corresponding process attributes. For example, the character string may be a combination of a predetermined number of terms that distinguish the corresponding software application from other software applications. In some cases, the process attributes may be processed by one or more machine learning models (e.g., an artificial neural network, a clustering algorithm, etc.) to generate at least part of the corresponding application fingerprint.

Automated service suggestion may evaluate the relationships between these fingerprints and known configuration items (e.g., the computing devices on which the discovered processes are executing or to which their process attributes refer), and create connections therebetween. These connections can be used to create a candidate service map as a representation of a service that might otherwise be unmapped. Then, automated service suggestion takes the information provided by the machine learning technique and further simplifies the mapping process. It can calculate entry points through which client devices may access the service, eliminating the challenge related to knowing where to begin mapping an application service.

Predictive intelligence can use information from various sources (e.g., CMDB 500 as well as incident, change request, and/or log files or databases) and/or network traffic patterns to identify possible relationships between configuration items. The traffic patterns may be based on network connections (e.g., TCP connections) between configuration items and/or executing processes. Predictive intelligence may rank these connections by their predicted relevancy. For example, only sufficiently relevant network connections (e.g., those with an adequate volume or rate of network traffic) might be included in a candidate service map. But, these decisions may be reviewed and overridden by a subject matter expert. Also, network connections may be created based on predetermined connection rules—e.g., if a network connection matches a connection rule, the network connection can be automatically added to a candidate service map as a relationship. In doing so, predictive intelligence may rely to some extent on traffic-based discovery but has the advantage of generating more accurate and less cluttered candidate service maps. For instance, a connection rule may be a traffic-based condition (e.g., more than a particular volume or rate of network traffic between any web server and any database triggers a connection to be created therebetween).

Both automated service suggestion and predictive intelligence may employ machine learning to automatically generate dozens or hundreds of reasonably accurate candidate service maps. In contrast, other forms of service mapping (e.g., those that are pattern based) may require development and execution of a pattern to discover service maps as well as extensive editing of generated service maps. In other words, automated service suggestion and predictive intelligence can often produce better service maps much faster than previous techniques.

As noted above, these candidate service maps can be populated in CMDB 500 as entries within a table perhaps dedicated to just candidate service maps. Once approved, they may be moved to the table of approved service maps.

They may also be incorporated into a service mapping application or other applications for production use.

Figure 6:
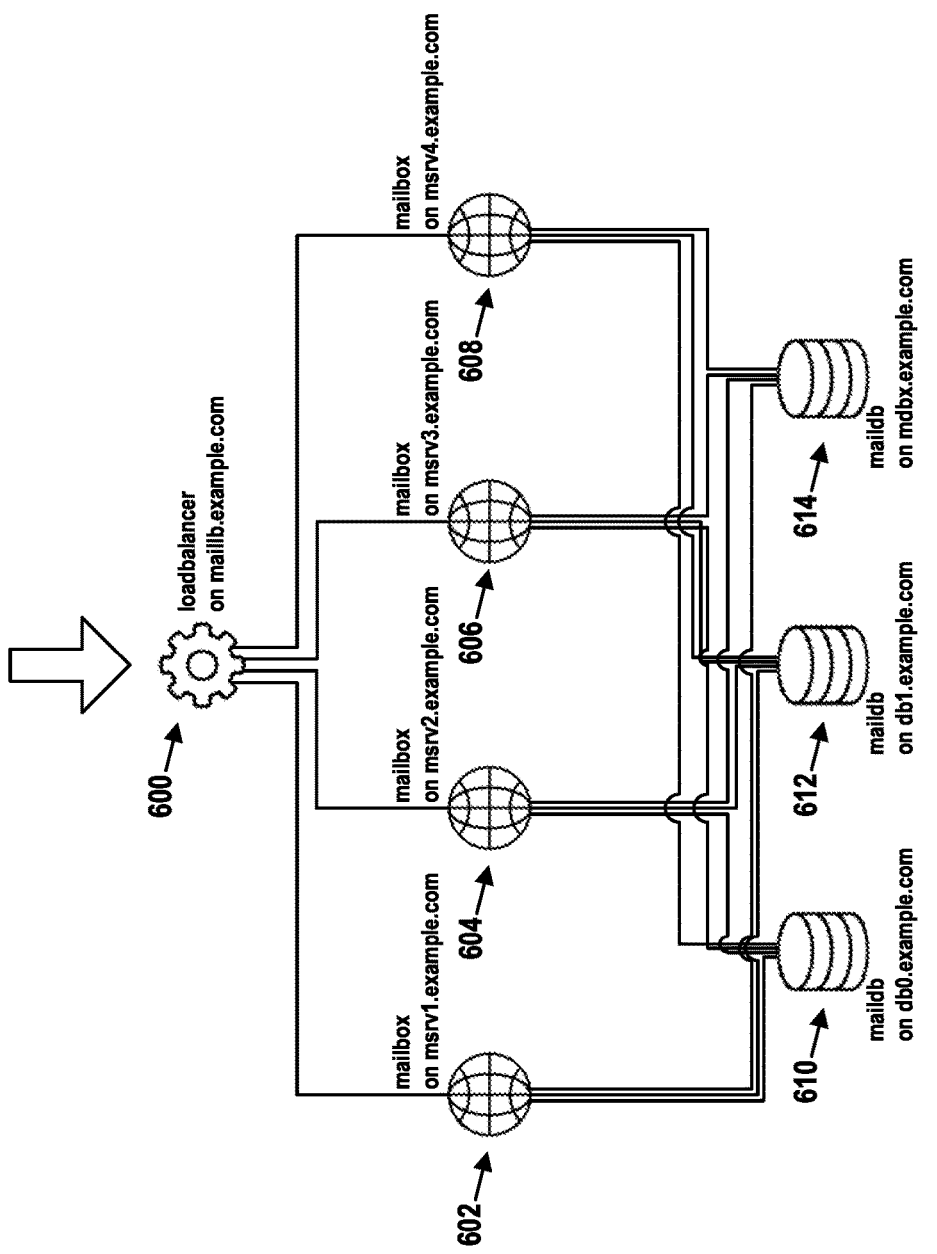
FIG. 6 depicts a service map, in accordance with example embodiments.

For purposes of example, FIG. 6 provides a service map including configuration items and relationships that make up an email service that supports redundancy and high-availability. This service map may have been initially generated by either pattern-based discovery, automated service suggestions, or predictive intelligence, and may have been manually edited to some extent. In any case, the service map may be represented in a manner that can be displayed on the screen of a computing device.

The nodes in the service map (i.e., nodes 600, 602, 604, 606, 608, 610, 612, and 614) represent applications operating on computing devices. Visually, these nodes may take the form of icons related to the respective functions of the applications or computing devices. The edges in the service map represent relationships between the nodes (e.g., "is hosted on", "runs on", "depends on", or "used by"), though specific labeling of relationships is omitted from FIG. 6 to avoid clutter. For purposes of the internal representation and manipulation thereof, the visual depictions of nodes as icons and edges as lines is not relevant—other visual depictions may be used.

The entry point to the email service, as designated by the large downward-pointing arrow, may be load balancer 600 ("loadbalancer"). Load balancer 600 may be represented with a gear icon, and may operate on a device with host name maillb.example.com. This host name, as well as other host names herein, may be a partially-qualified or fully-qualified domain name in accordance with DNS domain syntax. Alternatively, IP addresses or other identifiers can be used.

Load balancer 600 may distribute incoming requests across mailbox applications 602, 604, 606, and 608 ("mailbox") operating on mail server devices msrv1.example.com, msrv2.example.com, msrv3.example.com, and msrv4.example.com, respectively. These mail server devices may be represented by globe icons on the service map. Connectivity between load balancer 600 and each of mailbox applications 602, 604, 606, and 608 is represented by respective edges.

Mailbox applications 602, 604, 606, and 608 may, for instance, respond to incoming requests for the contents of a user's mail folder, for the content of an individual email message, to move an email message from one folder to another, or to delete an email message. Mailbox applications 602, 604, 606, and 608 may also receive and process incoming emails for storage by the email service. Other email operations may be supported by mailbox applications 602, 604, 606, and 608. For sake of example, it may be assumed that mailbox applications 602, 604, 606, and 608 perform essentially identical operations, and any one of these applications may be used to respond to any particular request.

The actual contents of users' email accounts, including email messages, folder arrangements, and other settings, may be stored in one or more of mail database applications 610, 612, and 614 ("maildb"). These applications may operate on database server devices db0.example.com, db1.example.com, and mdbx.example.com, which are represented by database icons on the service map. Connectivity between mailbox applications 602, 604, 606, and 608 and each of mail database applications 610, 612, and 614 also is represented by respective edges.

Mailbox applications 602, 604, 606, and 608 may retrieve requested data from mail database applications 610, 612, and 614, and may also write data to mail database applications 610, 612, and 614. The data stored by mail database applications 610, 612, and 614 may be replicated across all of the database server devices.

As an example of the operation of the email service depicted by the service map of FIG. 6, an incoming email message may arrive at load balancer 600. This email message may be addressed to an email account (e.g., user@example.com) supported by the email service. Load balancer 600 may select one of mailbox applications 602, 604, 606, and 608 to store the email message. For instance, load balancer 600 may make this selection based on a round-robin procedure, the loads (e.g., CPU, memory, and/ or network utilization) reported by mailbox applications 602, 604, 606, and 608, randomly, or some combination thereof.

Assuming that load balancer 600 selects mailbox application 604, load balancer 600 then transmits the email message to mailbox application 604. Mailbox application 604 may perform any necessary mail server functions to process the email message, such as verifying that the addressee is supported by the email server, validating the source of the email message, running the email message through a spam filter, and so on. After these procedures, mailbox application 604 may select one of mail database applications 610, 612, and 614 for storage of the email message. Similar to load balancer 600, mailbox application 604 may make this selection based on various criteria, including load on mail database applications 610, 612, and 614.

Assuming that mailbox application 604 selects mail database application 610, mailbox application 604 then transmits the email message to mail database application 610. Mail database application 610 may perform any necessary mail database functions to process and store the email message. For instance, mail database application 610 may store the message as a compressed file in a file system, and update one or more database tables to represent characteristics of the email message (e.g., the sender, the size of the message, its importance, where the file is stored, and so on).

When a mail client application (not shown) requests a copy of the email message, this request may also be received by load balancer 600. Load balancer 600 may select one of mailbox applications 602, 604, 606, and 608 to retrieve the email message. This selection may be made according to various criteria, such as any of those discussed above. Assuming that load balancer 600 selects mailbox application 608, mailbox application 608 then selects one of mail database applications 610, 612, and 614. Assuming that mailbox application 608 selects mail database application 612, mailbox application 608 requests the email message from mail database application 612.

Since data is replicated across mail database applications 610, 612, and 614, mail database application 612 is able to identify and retrieve the requested email message. For instance, mail database application 612 may look up the email message in a database table, from the table determine where the email message is stored in its file system, find the email message in the file system, and provide the email message to mailbox application 608. Mailbox application 608 may then transmit the email message to the mail client application.

The arrangement of the service map in FIG. 6 may vary. For example, more or fewer load balancers, mailbox applications, mail database applications, as well as their associated devices, may be present. Furthermore, other devices may be included, such as storage devices, routers, switches, and so on. Additionally, while FIG. 6 is focused on an example email service, similar network graphs may be generated and displayed for other types of services, such as web services, remote access services, automatic backup services, content delivery services, and so on.

VII. USE OF SERVICE MAPS WITH EVENT MANAGEMENT

Event management is a further software application or module executing on or available to remote network management platform 320. Event management provides mechanisms for identifying, analyzing, and prioritizing operational issues relating to a managed network. In doing so, it can aggregate and filter events reported by various monitoring tools. Here, events (also referred to as "network events") can be anything from minor performance degradations to complete service outages.

An event can be represented as a data structure with multiple fields, often stored in the form of an entry in a database table. FIG. 7A depicts an example event schema 700 containing a number of fields. But the types, meanings, and content of event fields can vary.

With event schema 700, an event can identify a configuration item or device address to which the event applies (e.g., with the node, resource, source instance, and/or configuration item fields), a metric type and metric that caused the event to occur (e.g., with the type and metric name fields), the source of the event (e.g., the source field), the time of the event (e.g., the time of event field), the severity of the event (e.g., the severity field), the alert (if any) to which the event is related (e.g., the alert and message key fields), and so on.

FIG. 7B depicts an example event 702 arranged in accordance with schema 700. In event 702, a network performance monitor device or software (as indicated by the source field) has generated an event relating to a computing device with the domain name server 123.company.com (as indicated by the node field) and the specific configuration item of a Windows server named server123 (as indicated by the configuration item field). The event relates to CPU-2 of this computing device (as indicated in by the resource field), which is of type CPU (as indicated in the type field). The event was generated at 2:30 pm on Dec. 1, 2023 (as indicated by the time of event field) due to CPU-2 exceeding 90% usage (as indicated by the description field) based on the CPU usage metric (as indicated by the metric name field). The event has been classified as having major severity (as indicated by the severity field) and is ready for review (as indicated by the state and processing notes fields).

Events may be related to alerts. When an event is deemed significant based on predefined criteria (like severity, type, or node), an alert may be created. An alert is a consolidated representation of one or more events that signify an issue requiring attention. The criteria for alert creation are configurable and can be tailored to specific needs and priorities. Multiple related events can be grouped into a single alert. This grouping may be based on pre-defined correlation rules. For example, if several events are generated in a short time frame indicating high CPU usage on the same server, these might be grouped into a single alert. Alerts serve as a trigger for further action. In many cases, an alert will lead to the creation of an incident. Incidents are records that initiate a workflow for resolving an issue (e.g., a CPU with 90% or greater utilization). Alerts can also be sent to predefined administrators or administrative groups via email, text message, push notification, etc. to notify these individuals of one or more events that are deemed to be particularly problematic.

Notably, an event can identify a configuration item directly (using the configuration item field) or indirectly (by identifying a node name, domain name, IP address, or MAC address associated with or used by the configuration item as indicated by the node field). In this fashion, events serve to identify computing devices and software applications that are unavailable, overloaded, performing poorly, or suffering from some other defect.

To that point, event management can be integrated with service mapping. For example, service mapping can make service maps available that specify the context in which the event occurred. With this, event management can pinpoint which services are affected and understand the impact of the event on the service delivery, performance, and uptime. For instance, an event indicating that a server device is suffering from high processor utilization may impact all services involving that server device.

This integration also provides enhanced visibility into the computing infrastructure of the managed network, allowing for more effective control of the services thereon. It helps in identifying the root cause of issues faster, reducing the time to resolution, and improving overall service health. Moreover, if a service component fails (e.g., a configuration item in a service map becomes unavailable or exhibits certain faults), event management can automatically create an incident (e.g., a trouble ticket) by using the service map to identify the impacted service and prioritize the incident accordingly.

Thus, an impact analysis may occur for each generated event. First, event management may determine the configuration item(s) directly and/or indirectly impacted by the event (e.g., by way of the configuration item field or the node field of the event, as noted above). Then, event management may determine whether each configuration item is part of a service map. If so, event management analyzes the impact based on the severity of the event (as indicated by the severity field), as well as the configuration item's role and dependencies within the service. For example, if a database server experiences an issue, all services dependent on that database may be marked as impacted.

If an event significantly impacts a service, an alert may be generated. The alert may indicate that there is a potential issue with the service. The alert is then correlated with the service map to determine which parts of the service are at risk. Responsible individuals may be notified.

From a user interaction perspective, an administrator or other user may be initially provided with a user interface screen that displays a list of events (e.g., in decreasing order of severity). If the administrator selects an event, a further screen may display details of the event as well as a list of services potentially impacted by the event. If the administrator further selects one of the services, a service map for that service may be rendered on yet another screen (e.g., like FIG. 6). Thus, through a graphical user interface of remote network management platform 320, the affected service and its impacted components can be visually represented on a service map, providing a clear view of the issue's scope. In this manner, the administrator can rapidly identify the services and other configuration items potentially impacted by the event.

VIII. USE OF CANDIDATE SERVICE MAPS WITH EVENT MANAGEMENT

As noted above, the number of approved service maps relating to a managed network may represent only a relatively small number of services that involve the managed network. This is because the approval process for a new service map can take a significant amount of time (e.g., weeks or months). On the other hand, automated service suggestions and predictive intelligence can generate a large number of candidate service maps very quickly. While these candidate service maps are typically accurate to a large extent (e.g., 70-90% accurate), they also may involve an amount of manual testing, editing, and approval before any can moved into the list of approved service maps.

As a consequence, there may be only a handful (e.g., 10 or fewer) approved service maps at a given time for a managed network. However, the managed network may have hundreds of unmapped services deployed (e.g., services with no service maps or services with service maps that are candidates or otherwise not yet approved). Thus, the efficacy of event management is limited because events identifying or involving configuration items that are part of unmapped services cannot be used to identify the services that are potentially impacted by the events. Further, the full value of event management is only achieved in the presence of robust and reasonably complete service mapping.

But, as noted, there may be dozens or hundreds of candidate service maps. These candidate service maps can be used to identify services that are also potentially impacted by an event. Even if the candidate service maps are not perfectly accurate and may occasionally lead to false positives, they can often identify impacted services that otherwise would remain unidentified. Further, since these candidate service maps already exist in a CMDB table or elsewhere, they can be used without undertaking any additional discovery. Thus, event management can be arranged to search the candidate service map table as well as the approved service map table.

This process may identify one or more candidate service maps (e.g., using automated service suggestion, predictive intelligence, or some other form of machine learning) for services that are potentially impacted by an event. The administrator may be given an option to view visualizations of these services, create a new approved service map based on an identified service map, or combine the candidate service map into an existing approved service map.

FIGS. 8A and 8B are flow charts providing examples of how candidate service maps can be used in conjunction with approved service maps to determine the impact of events. Alternatively, candidate service maps can be used alone for this purpose. Each of FIGS. 8A and 8B provide a set of steps, some of which could be performed in a different order. Further, more or fewer steps may be employed by various implementation. Moreover, these steps may be performed by an event management application or some other type of application executing on remote network management platform or on a different system. In some cases, the features of FIGS. 8A and 8B can be combined into a single flow chart incorporating aspects of both.

Step 800 may involve obtaining an event. This event may be a new event that was generated in response to recently-detected state changes in the managed network, its computing devices, its software applications, and/or its cloud-based services. Alternatively, the event may be a stored event that may have occurred previously (e.g., minutes, hours, or days before step 800 is carried out).

Step 802 may involve determining the configuration items identified by the event. This can be accomplished directly (e.g., by examining the configuration item field of the event) or indirectly (e.g., by examining the node field of the event). In the latter case, the node field may specify a network address or another identifying attribute that can be looked up in CMDB 500 in order to determine one or more related configuration items. For example, if the node field specifies an IP address of a server device, a search of CMDB 500 may return a configuration item associated with that IP address and representing the server device. Notably, step 802 may result in determination of one or more configuration items identified by the event.

Step 804 may involve searching the approved service maps to identify services that include at least one of the identified configuration items. For example, the approved service maps may be represented as entries in a table of approved service maps. This search may return zero or more service maps.

Step 806 may involve searching the candidate service maps to identify services that include at least one of the identified configuration items. For example, the candidate service maps may be represented as entries in a table of candidate service maps. This search may also return zero or more service maps.

Notably, the approved and candidate service maps could be stored in different tables or the same table. In they are stored in the same table, each service map entry may be marked (e.g., with a Boolean or integer value) to indicate whether the service map is approved or a candidate.

Step 808 may involve providing a list of services with approved and/or candidate service maps that include at least one of the configuration items. This list may entail the service maps identified in steps 804 and 806, for example. Pointers or references to these service maps may be associated with the event. An administrator may then be able to view these service maps when viewing details of the event.

For example, the service maps may be displayed in a list on the graphical user interface with the approved service maps appearing in the list before the candidate service maps. Alternatively, the approved service maps and candidate service maps may be represented in separate lists or on separate graphical user interfaces. In any of these cases, each service map represented may clearly indicate whether it is approved or a candidate.

Notably, a name and/or description of each service map—rather than a visualization of the service map itself, may appear in the list. If the administrator selects a service map from the list, then a visualization of it (e.g., like that of FIG. 6) may be displayed.

FIG. 8B depicts a similar process as that of FIG. 8A. As was the case for FIG. 8A, the approved service maps are searched to find services with a configuration item related to those identified by the event. These approved service maps may also contain additional configuration items (i.e., configuration items not specifically identified by the event). Then, unlike the process of FIG. 8A, the process of FIG. 8B may involve searching the candidate service maps for the additional configuration items. Doing so allows an expanded search to take place. Particularly, if an approved service map is impacted by an event, the event may also impact candidate service maps that share some of the additional configuration items with the approved service map.

As an example, suppose that an event identifies a server device that is part of an approved service that also includes a database device and database software. If the root cause of the issue found for the server device (and reported in the event) is actually that the database device or database server are performing poorly, then it is likely that any other service using the database device or database server may also be impacted. Thus, the process of FIG. 8B can be used to identify candidate service maps including the database device or database server, and to flag these candidate service maps as potentially impacted by the event.

In this manner, more potentially impacted services can be identified. In alternative embodiments, the process of FIG. 8B may also search the approved service maps for the additional configuration items. Nonetheless, the discussion below of FIG. 8B largely follows the discussion of FIG. 8A for purposes of completeness.

Step 810 may involve obtaining an event. This event may be a new event that was generated in response to recently-detected state changes in the managed network, its computing devices, its software applications, and/or its cloud-based services. Alternatively, the event may be a stored event that may have occurred previously (e.g., minutes, hours, or days before step 800 is carried out).

Step 812 may involve determining the configuration items identified by the event. This can be accomplished directly (e.g., by examining the configuration item field of the event) or indirectly (e.g., by examining the node field of the event). In the latter case, the node field may specify a network address or another identifying attribute that can be looked up in CMDB 500 in order to determine one or more related configuration item. For example, if the node field specifies an IP address of a server device, a search of CMDB 500 may return a configuration item associated with that IP address and representing the server device. Notably, step 812 may result in determination of one or more configuration items identified by the event.

Step 814 may involve searching the approved service maps to identify services that include at least one of the identified configuration items. For example, the approved service maps may be represented as entries in a table of approved service maps. This search may return zero or more service maps. Each of these service maps may include additional configuration items. A list of all additional configuration items may be produced.

Step 816 may involve searching the candidate service maps to identify services that include at least one of the additional configuration items (e.g., from the list). For example, the candidate service maps may be represented as entries in a table of candidate service maps. This search may also return zero or more candidate service maps.

Notably, the approved and candidate service maps could be stored in different tables or the same table. In they are stored in the same table, each service map entry may be marked (e.g., with a Boolean or integer value) to indicate whether the service map is approved or a candidate.

Step 818 may involve providing a list of services with approved or candidate service maps that include at least one of the configuration items. This list may entail the service maps identified in steps 814 and 816, for example. Pointers or references to these service maps may be associated with the event. An administrator may then be able to view these service maps when viewing details of the event.

For example, the service maps may be displayed in a list on the graphical user interface with the approved service maps appearing before the candidate service maps. Alternatively, the approved service maps and candidate service maps may be represented in separate lists or on separate graphical user interfaces. In any of these cases, each service map represented may clearly indicate whether it is approved or a candidate.

Notably, a name and/or description of each service map—rather than a visualization of the service map itself, may appear in the list. If the administrator selects a service map from the list, then a visualization of it (e.g., like that of FIG. 6) may be displayed.

IX. EXAMPLE TECHNICAL IMPROVEMENTS

These embodiments provide a technical solution to a technical problem. One technical problem being solved is root cause analysis in computer networks. In practice, performing this type of operation is problematic because current analysis tools may fail to determine the complex relationships between the thousands or tens of thousands of configuration items on or accessible to a network.

In the prior art, event management often failed to identify at least some (if not the majority) of the services impacted by events. This resulted in more system downtime, poorer performance, and more effort needed to identify and address technical issues in the network. Thus, prior art techniques were incomplete and unwieldy at best.

The embodiments herein overcome these limitations by employing candidate service maps generated by machine learning. These service maps, while possibly unapproved, often contain valuable information with respect to the relationships and connections between various configuration items. Thus, using candidate service maps with event management can more accurately and rapidly identify not only the root causes of device and network problems, but also the services impacted.

Other technical improvements may also flow from these embodiments, and other technical problems may be solved. Thus, this statement of technical improvements is not limiting and instead constitutes examples of advantages that can be realized from the embodiments.

X. EXAMPLE OPERATIONS

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 may involve obtaining a representation of a network event relating to a network, wherein the network enables operation of a plurality of services each involving one or more computing devices or software applications.

Block 902 may involve obtaining information associated with the network event, wherein the information identifies one of the computing devices or the software applications.

Block 904 may involve, based on the information, identifying a subset of services of the plurality of services based on determining that each of the subset of services satisfies an impact criterion with respect to the network event, wherein the subset of services are associated with candidate service maps that were generated by a machine learning process; and Block 906 may involve providing an indication that the subset of services are related to the network event.

In some examples, the representation of the network event was generated by an event management application that receives monitoring data relating to status of the one or more computing devices or software applications.

In some examples, the network event is represented as a set of fields that specify one or more of a source of the network event, a network address or network name of a computing device related to the network event, a unique identifier of the computing device related to the network event as appearing in a configuration management database, a severity of the network event, a time of occurrence of the network event, or a reason for generation of the network event.

In some examples, the information associated with the network event comprises a network address of a computing device related to the network event, a network name of the computing device related to the network event, or a unique identifier of the computing device related to the network event as appearing in a configuration management database.

Some examples may involve, based on the information, identifying a further subset of services of the plurality of services, wherein the subset of services are associated with approved service maps.

In some examples, the candidate service maps are disjoint from the approved service maps. In some examples, the approved service maps have passed an approval process and the candidate service maps have not passed the approval process. In some examples, wherein the impact criterion with respect to the network event is that each of the subset of services includes a common one of the one or more computing devices or software applications with the further subset of services.

In some examples, the impact criterion with respect to the network event is that that each of the subset of services includes the one of the computing devices or the software applications.

In some examples, providing the indication that the subset of services are related to the network event comprises updating an event management database to specify that the network event is related to each of the subset of services.

In some examples, wherein providing the indication that the subset of services are related to the network event comprises transmitting, to a client device, a notification specifying that at least one of the subset of services is potentially impacted by the network event.

In some examples, the impact criterion with respect to the network event comprises that the network event potentially impacts each of the subset of services.

XI. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:

obtaining a representation of a network event relating to a network, wherein the network enables operation of a plurality of services each involving one or more computing devices or software applications;

obtaining information associated with the network event, wherein the information identifies one of the one or more computing devices or the software applications;

based on the information, identifying a first subset of services of the plurality of services that satisfies an impact criterion with respect to the network event, wherein the first subset of services is associated with approved service maps, wherein the approved service maps contain representations of one or more additional computing devices or additional software applications;

based on the one or more additional computing devices or the additional software applications, identifying a second subset of services of the plurality of services that satisfies the impact criterion with respect to the network event, wherein the second subset of services is associated with candidate service maps that were automatically generated by a predictive intelligence process that includes network connections from the network that exceed a threshold extent of network traffic, wherein the candidate service maps have not been approved for production use;

causing an incident database to create an incident record based on one or more of the second subset of services, wherein the incident record is configured to initiate a workflow associated with the network event;

using the candidate service maps, performing functional testing, wherein the functional testing involves simulating one or more scenarios; and based on the simulation of the one or more scenarios, approving a candidate service map of the candidate service maps for production use.

2. The method of claim 1, wherein the representation of the network event was generated by an event management application that receives monitoring data relating to status of the one or more computing devices or the software applications.

3. The method of claim 1, wherein the network event is represented as a set of fields that specify one or more of a source of the network event, a network address or network name of a computing device related to the network event, a unique identifier of the computing device related to the network event as appearing in a configuration management database, a severity of the network event, a time of occurrence of the network event, or a reason for generation of the network event.

4. The method of claim 1, wherein the information associated with the network event comprises a network address of a computing device related to the network event, a network name of the computing device related to the network event, or a unique identifier of the computing device related to the network event as appearing in a configuration management database.

5. The method of claim 1, wherein the candidate service maps are disjoint from the approved service maps.

6. The method of claim 1, wherein the approved service maps have been approved for production use.

7. The method of claim 1, wherein the impact criterion with respect to the network event is that the first subset of services includes the one of the one or more computing devices or the software applications.

8. The method of claim 1, further comprising:

providing an indication that the second subset of services is related to the network event, wherein providing the indication that the second subset of services is related to the network event comprises updating an event management database to specify that the network event is related to each service in the second subset of services.

9. The method of claim 1, further comprising:

providing an indication that the second subset of services is related to the network event, wherein providing the indication that the second subset of services is related to the network event comprises transmitting, to a client device, a notification specifying that at least one service in the second subset of services is potentially impacted by the network event.

10. The method of claim 1, wherein the impact criterion with respect to the network event comprises that the network event potentially impacts each service in the second subset of services.

11. The method of claim 1, wherein the predictive intelligence process comprises:

ranking the network connections according to their respective extents of the network traffic; and including, in the candidate service maps, the network connections exceeding the threshold extent of the network traffic.

12. The method of claim 1, further comprising:

initiating, based on the incident record, the workflow for resolving the network event.

13. The method of claim 1, wherein the impact criterion with respect to the network event is that the second subset of services includes the one of the one or more computing devices or the software applications.

14. A non-transitory computer-readable medium, having stored thereon program instructions that, upon execution by a computing system, cause the computing system to perform operations comprising:

obtaining a representation of a network event relating to a network, wherein the network enables operation of a plurality of services each involving one or more computing devices or software applications;

obtaining information associated with the network event, wherein the information identifies one of the one or more computing devices or the software applications;

based on the information, identifying a first subset of services of the plurality of services that satisfies an impact criterion with respect to the network event, wherein the first subset of services is associated with approved service maps, wherein the approved service maps contain representations of one or more additional computing devices or additional software applications;

based on the one or more additional computing devices or the additional software applications, identifying a second subset of services of the plurality of services that satisfies the impact criterion with respect to the network event, wherein the second subset of services is associated with candidate service maps that were automatically generated by a predictive intelligence process that includes network connections from the network that exceed a threshold extent of network traffic, wherein the candidate service maps have not been approved for production use;

causing an incident database to create an incident record based on one or more of the second subset of services, wherein the incident record is configured to initiate a workflow associated with the network event;

using the candidate service maps, performing functional testing, wherein the functional testing involves simulating one or more scenarios; and based on the simulation of the one or more scenarios, approving a candidate service map of the candidate service maps for production use.

15. The non-transitory computer-readable medium of claim 14, wherein the information associated with the network event comprises a network address of a computing device related to the network event, a network name of the computing device related to the network event, or a unique identifier of the computing device related to the network event as appearing in a configuration management database.

16. The non-transitory computer-readable medium of claim 14, wherein the impact criterion with respect to the network event is that the first subset of services includes the one of the one or more computing devices or the software applications.

17. The non-transitory computer-readable medium of claim 14, wherein the impact criterion with respect to the network event is that the second subset of services includes the one of the one or more computing devices or the software applications.

18. The non-transitory computer-readable medium of claim 14, wherein the program instructions cause the computing system to perform operations further comprising:

providing an indication that the second subset of services is related to the network event, wherein providing the indication that the second subset of services is related to the network event comprises updating an event management database to specify that the network event is related to each service in the second subset of services.

19. A system comprising:

one or more processors; and a memory, containing program instructions that, upon execution by the one or more processors, cause the system to perform operations comprising:

obtaining a representation of a network event relating to a network, wherein the network enables operation of a plurality of services each involving one or more computing devices or software applications;

obtaining information associated with the network event, wherein the information identifies one of the one or more computing devices or the software applications;

based on the information, identifying a first subset of services of the plurality of services that satisfies an impact criterion with respect to the network event, wherein the first subset of services is associated with approved service maps, wherein the approved service maps contain representations of one or more additional computing devices or additional software applications;

based on the one or more additional computing devices or the additional software applications, identifying a second subset of services of the plurality of services that satisfies the impact criterion with respect to the network event, wherein the second subset of services is associated with candidate service maps that were generated by a predictive intelligence process that includes network connections from the network that exceed a threshold extent of network traffic, wherein the candidate service maps have not been approved for production use;

causing an incident database to create an incident record based on one or more of the second subset of services, wherein the incident record is configured to initiate a workflow associated with the network event;

using the candidate service maps, performing functional testing, wherein the functional testing involves simulating one or more scenarios; and based on the simulation of the one or more scenarios, approving a candidate service map of the candidate service maps for production use.

* * * * *